United States Patent Office 3,316,994
Patented May 2, 1967

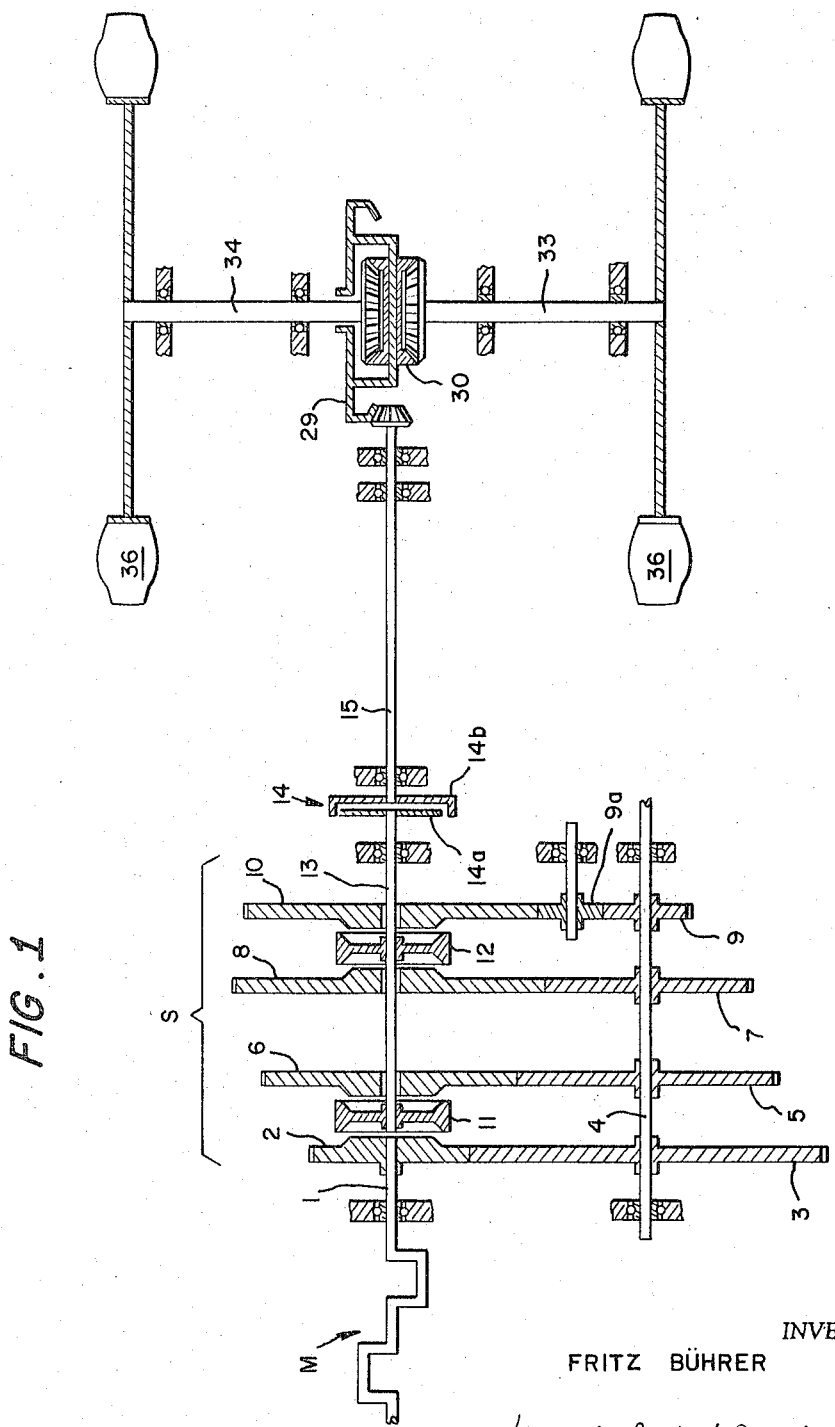

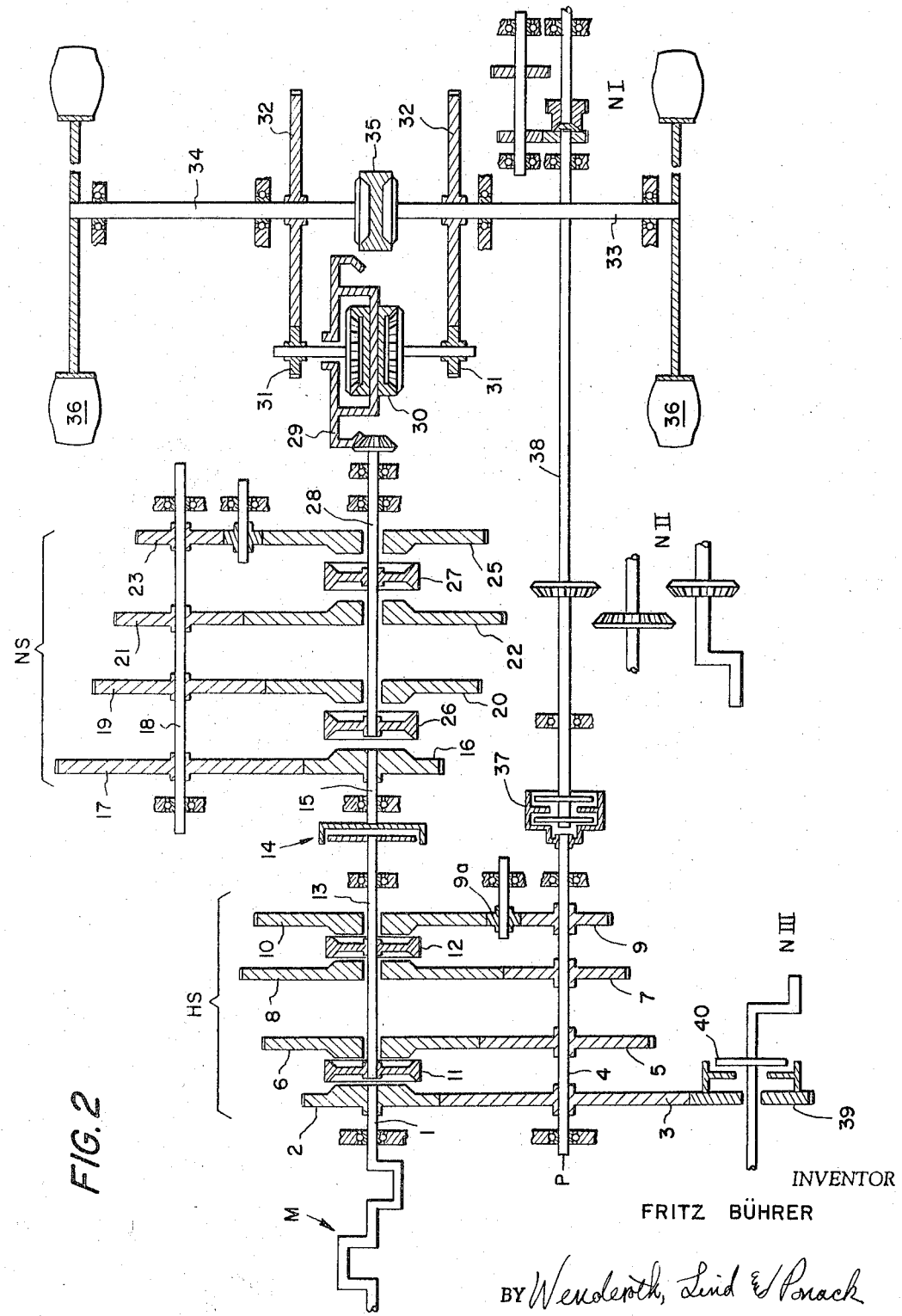

3,316,994
POWER TRANSMISSION ARRANGEMENT
Fritz Bührer, Hinwil, Zurich, Switzerland
Filed July 9, 1964, Ser. No. 381,414
5 Claims. (Cl. 180—53)

This invention relates to a power transmission arrangement for power driven vehicles, especially tractors, and particularly vehicles having a synchromesh transmission. In describing the relative positions of the units comprising the transmission arrangement of the present invention, it will be assumed that the engine is at the front of the vehicle, the transmission is behind the engine and the drive shaft, by which power is transmitted from the transmission to the rear axle, is behind the transmission.

In known power transmission arrangements for power driven vehicles the neutral or main clutch, such as a friction clutch or the like, for coupling the stationary or slowly moving vehicle drive wheels to a much faster moving drive shaft, is placed immediately behind the engine and in front of the transmission which, nowadays, is usually a synchromesh transmission. This arrangement has the disadvantage, in the case of a synchromesh transmission, that the synchronizing clutches must be sufficiently large and powerful to synchronize all the driving parts of the transmission. That is, the speed of the input shaft, the secondary shaft and all the gears must be synchronized with the speed of the output shaft, the speed of which is dependent upon the speed of movement of the vehicle. The mass, and therefore the momentum, of these parts is considerable. In the case of a tractor, for example, in which very often the vehicle speed falls to zero before a change is made, so that the output shaft of the transmission has been brought to a standstill, all of the driving members, that is, the transmission input shaft, the secondary shaft and all the gears, must be brought to a standstill before the gear change can be made.

In order to overcome this disadvantage, the transmission arrangement according to the invention has the clutch for coupling the drive shaft to the engine placed behind the transmission. This has the very substantial advantage that the synchronizing clutches may be kept very small, and can be the same size for all speed ratios, because once the clutch has been disengaged only the transmission output shaft has to be synchronized with the driving members in the transmission.

The invention consists of a power transmission arrangement for power driven vehicles, especially tractors, and particularly vehicles having a synchromesh transmission, characterized in that the clutch for coupling the drive shaft to the engine is placed behind the transmission. In the case of a tractor having primary and secondary transmissions, the clutch is conveniently placed behind the primary transmission and in front of the secondary transmission.

Two embodiments of the invention will now be described with reference to the accompanying drawings in which—

FIGURE 1 is a diagrammatic representation of a power transmission arrangement with the clutch placed behind the transmission in accordance with the invention; and FIGURE 2 is a diagrammatic representation of a power transmission arrangement according to the invention for a tractor with primary and secondary transmissions and three auxiliary power drives or power take-offs.

Referring to FIGURE 1, the power transmission arrangement comprises an engine M, a synchromesh transmission S driven by the engine and a clutch 14 of the type for coupling two relatively rotating shafts, which clutch is placed on the opposite side of the transmission from the transmission and which in the present embodiment is shown as being of the type having clutch discs 14a and 14b and having its output shaft coupled to a drive shaft 15 which drives the rear axle half-shafts 33 and 34 through a differential gear 29, 30, the half-shafts 33 and 34 having mounted thereon the rear wheels 36, in the conventional manner.

The engine M is directly coupled to the input shaft 1 of the transmission to be driven at a constant speed relative to the engine at all times during the normal operation of the arrangement and drives the secondary shaft 4 through gear 2 on the input shaft meshing with gear 3 on the secondary shaft. The secondary shaft 4 has mounted upon it further gears 5, 7 and 9. An output shaft 13 extends coaxially of the input shaft 1, and has gear 6 thereon meshed with a gear 5 on the secondary shaft, gear 8 meshed with gear 7 on the secondary shaft, and gear 10 coupled through reversing gear 9a to gear 9 on the secondary shaft. Synchronizing elements 11 and 12 are mounted on output shaft 13 for movement back and forth between gears 2 and 6 and gears 8 and 10 respectively. When synchronizing element 11 is moved to the left in the drawing, it couples the input shaft 1 directly to the output shaft 13 of the transmission. This is the third or top speed. By moving the synchronizing element 11 to the right in the drawing, the drive from the input shaft 1 is transmitted through gears 2 and 3 to the secondary shaft 4 and from the latter through the gear 5 on the secondary shaft 4 to gear 6 on the output shaft 13. This is the second speed. By leaving the synchronizing element 11 in its neutral position and moving the synchronizing element 12 to the left in the drawing, the drive is taken from the transmission input shaft 1 through the gear 2 and 3 to the secondary shaft 4 and thence through the gears 7 and 8 to the output shaft 13. This is first speed. By moving the synchronizing element 12 to the right in the drawing the drive is transmitted from the input shaft 1 via gears 2 and 3 to the auxiliary shaft 4 and thence through gears 9, 9a and 10 to the output shaft 13. Due to the interposition of the reversing gear 9a the direction of rotation of the output shaft is reversed, and this is the reverse gear.

The transmission output shaft 13 is coupled by the clutch 14 to the drive shaft 15 and from there through the differential gears 29 and 30 to the rear axle half-shafts 33 and 34 on the ends of which are mounted the wheels 36.

When changing gears after disengaging the clutch 14, the synchronizing elements need only bring the speed of the output shaft 13, together with the clutch disc 14a, to the required speed; that is to say, the synchronizing elements need only accommodate themselves to the speeds of the driving members in the transmission. It will be obvious that due to their very small mass the shaft 13 and clutch disc 14a will quickly be brought to the synchronous speed, and the synchronizing clutch elements can therefore be made very small. Thereafter the clutch 14 is reengaged to bring the drive shaft up to the speed of the transmission output shaft 13.

FIGURE 2 shows a power transmission arrangement for a tractor, comprising an engine M directly coupled to a synchromesh primary transmission HS which in turn is coupled through the clutch 14 to a secondary transmission NS the output shaft 28 of which drives the rear axle gears 31 and 32 in the conventional manner through a differential gear 29, 30, the rear axle gears 32 being mounted respectively on rear axle half-shafts 33 and 34 on the ends of which are the rear wheels 36. A differential lock 35 enables a rigid coupling to be provided between the half-shafts 33 and 34 when required.

The primary transmission HS is similar to the transmission S of FIGURE 1, like reference numerals being employed, so it does not need any further description. It should be noted, however, that an oil pump shaft P is driven from the front end of the secondary shaft 4 and, furthermore, a coupling 37 mounted on the other end of the secondary shaft 4 is arranged to drive a shaft 38 from which auxiliary drives or power take-offs NI and NII are driven. A further auxiliary drive or power take-off NIII is driven from the secondary shaft gear 3 by means of a gear 39 and a clutch 40.

The engine drives the input shaft 1 directly and power is transmitted to the secondary shaft 4 through the gears 2 and 3, as with the transmission of FIG. 1. Power is transmitted from the secondary shaft 4 through gears 5, 7 or 9 to the output shaft 13. As in the case of FIGURE 1, movement of the synchronizing element 11 to the left produces top speed, movement of this element to the right produces second speed, movement of the element 12 to the left produces third speed, and movement of the element 12 to the right produces reverse movement.

The shaft 13 is a coupled through the clutch elements 14a and 14b of clutch 14 to the input shaft 15 of the secondary transmission NS. The secondary transmission NS can, for example, be a three-speed-and-reverse transmission and its output shaft 28 is coupled to the bevel gear 29, differential 30, rear axle gears 31, and gears 32 mounted on the rear axle half-shafts 33 and 34 which carry the rear wheels 36. The individual speeds of the secondary transmission are selected by means of synchronizing elements 26 and 27, by moving these to the left or to the right between gears 16 and 20 and gears 22 and 25 respectively, from their neutral positions shown in the drawings, as in the case of the primary transmission HS. Power is transmitted from gear 16 on input shaft 15 through gears 17, 19, 21 and 23 on secondary shaft 18, as in the primary transmission HS.

The clutch 14 is placed behind the primary transmission and in front of the secondary transmission.

When changing gears, either by means of the primary transmission HS or by means of the secondary transmission NS, the clutch 14 is disengaged.

In order to keep the mass of the parts to be synchronized, and therefore the synchronizing load in the primary transmission, as small as possible, the clutch disc 14a is mounted on the output shaft 13 of the primary transmission as in the case of the transmission S shown in FIGURE 1. When changing gears, only the output shaft 13 and the clutch disc 14a, whose mass and inertia are small, need to be brought to the synchronizing speed by the synchronizing clutch elements 11 and 12.

The secondary transmission NS is completely normal and gear changing is carried out in the ordinary way after disengaging the clutch 14. The masses of the rotating parts in the primary transmission, and the engine, are isolated from the secondary transmission when the clutch 14 is disengaged.

Since the secondary shaft 4 of the primary transmission HS is constantly driven by the engine, irrespective of whether the clutch 14 is engaged or disengaged, an uninterrupted drive is obtainable from the auxiliary drive or power take-off NI, NII and NIII and also for the oil pump shaft P. The latter may, of course, be a power unit for driving hydraulic apparatus.

The primary control of the auxiliary drives NI and NII is provided by the coupling 37 and shaft 38, while the auxiliary drive NIII may be engaged and disengaged by means of a sliding gear. The drive to the auxiliary drive NIII is unaffected by the operation of the cluch 14 or the auxiliary drive NI and NII.

I claim:
1. A power transmission arrangement for power driven vehicles comprising a motor, wheel driving means for driving the wheels of the vehicle, a synchromesh transmission having constantly rotating members, one of which is an input shaft directly coupled to the motor and being driven concurrently by said motor at all times when said motor is operative, and said members of said transmission further including synchronizing elements and an output shaft, a plural element clutch of the type for coupling two relatively rotating shafts wherein one of the elements of said clutch is directly coupled to the output shaft of said transmission and wherein the element of the clutch is coupled to the wheel driving means, whereby when it is desired to change gears, the clutch is disengaged and only the synchronizing elements and output shaft of the transmission and the said one element of the clutch need have the speed thereof changed to the synchronizing speed.

2. A power transmission arrangement as claimed in claim 1 in which said synchromesh transmission has a secondary shaft geared to the input shaft thereof, and at least one auxiliary power take-off coupled to said secondary shaft.

3. A power transmission arrangement as claimed in claim 2 in which means are provided between the secondary shaft of said synchromesh transmission and said power take-off for engaging and disengaging said power take-off from said secondary shaft.

4. A power transmission arrangement as claimed in claim 2 in which said auxiliary power take-off includes an oil pump coupled to said secondary shaft.

5. A power and power transmission arrangement for power driven vehicles consisting essentially of a motor and wheel driving means for driving the wheels of the vehicle, a first synchromesh transmission having constantly rotating members, one of which is an input shaft directly coupled to the motor and being driven concurrently by said motor at all times when said motor is operative, and said members of said first transmission further including synchronizing elements and an output shaft, a plural element clutch of the type for coupling two relatively rotating shafts wherein one of the elements of said clutch is directly coupled to the output shaft of said first transmission, a second synchromesh transmission having an input shaft coupled to another element of the clutch, said second transmission having an output shaft coupled to said wheel driving means, whereby when it is desired to change gears, the clutch can be disengaged and only the synchronizing elements and output shaft of the first transmission and the said one element of the clutch need have the speed thereof changed to the synchronizing speed.

References Cited by the Examiner
UNITED STATES PATENTS

| | | | |
|---|---|---|---|
| 2,223,002 | 11/1940 | Ferguson | 180—53 X |
| 2,316,130 | 4/1943 | Bohmer et al. | 180—53 |
| 2,970,482 | 2/1961 | Strehlow et al. | 74—745 X |
| 3,110,382 | 11/1963 | Jones | 74—339 |

A. HARRY LEVY, *Primary Examiner.*